United States Patent [19]

Cocchi

[11] Patent Number: 5,575,066
[45] Date of Patent: Nov. 19, 1996

[54] METHOD OF MANUFACTURING FREEZING CYLINDERS FOR ICE CREAM MAKING MACHINES

[75] Inventor: Gino Cocchi, Bologna, Italy

[73] Assignee: Carpigiani S.R.L., Italy

[21] Appl. No.: 888,843

[22] Filed: May 27, 1992

[30] Foreign Application Priority Data

Jun. 21, 1991 [IT] Italy ................................. GE91A0088

[51] Int. Cl.[6] .................................................... B23P 15/26
[52] U.S. Cl. .............................. 29/890.035; 29/890.048
[58] Field of Search ....................... 29/890.035, 890.036, 29/890.048, 890.043

[56] References Cited

U.S. PATENT DOCUMENTS

| 2,004,387 | 6/1935 | Dewald . | |
|---|---|---|---|
| 2,756,032 | 7/1956 | Dowell | 29/890.036 |
| 2,860,490 | 11/1958 | Taylor | 62/71 |
| 3,296,817 | 1/1967 | Stoelting | 29/890.035 |
| 3,545,063 | 12/1970 | Mitchell | 29/890.036 |
| 3,732,921 | 3/1973 | Helicki et al. | 29/890.036 |
| 3,777,343 | 12/1973 | D'Onofrio | 29/890.036 |
| 3,959,867 | 6/1976 | Frost | 29/890.036 |
| 4,349,950 | 9/1982 | Bowden | 29/890.036 |
| 4,960,170 | 10/1990 | Carter | 29/890.048 |
| 5,092,038 | 3/1992 | Geppelt et al. | 29/890.048 |

FOREIGN PATENT DOCUMENTS

| 395080 | 10/1990 | European Pat. Off. . | |
|---|---|---|---|
| 3000665 | 7/1981 | Germany | 29/890.035 |
| 58-136988 | 11/1983 | Japan . | |
| 732468 | 6/1955 | United Kingdom | 63/3 |

*Primary Examiner*—Irene Cuda
*Attorney, Agent, or Firm*—Larson and Taylor

[57] ABSTRACT

The invention relates to a method of manufacturing freezing cylinders for ice cream making machines, with incorporated evaporator of the refrigerating circuit, characterized in that it comprises the steps of: forming a helical groove on the outer surface of the freezing cylinder; winding a flat strip of annealed mild steel along said groove in screw-thread fashion, and shrink-fitting a heated cylindrical steel liner on the crests of said thread.

2 Claims, 2 Drawing Sheets

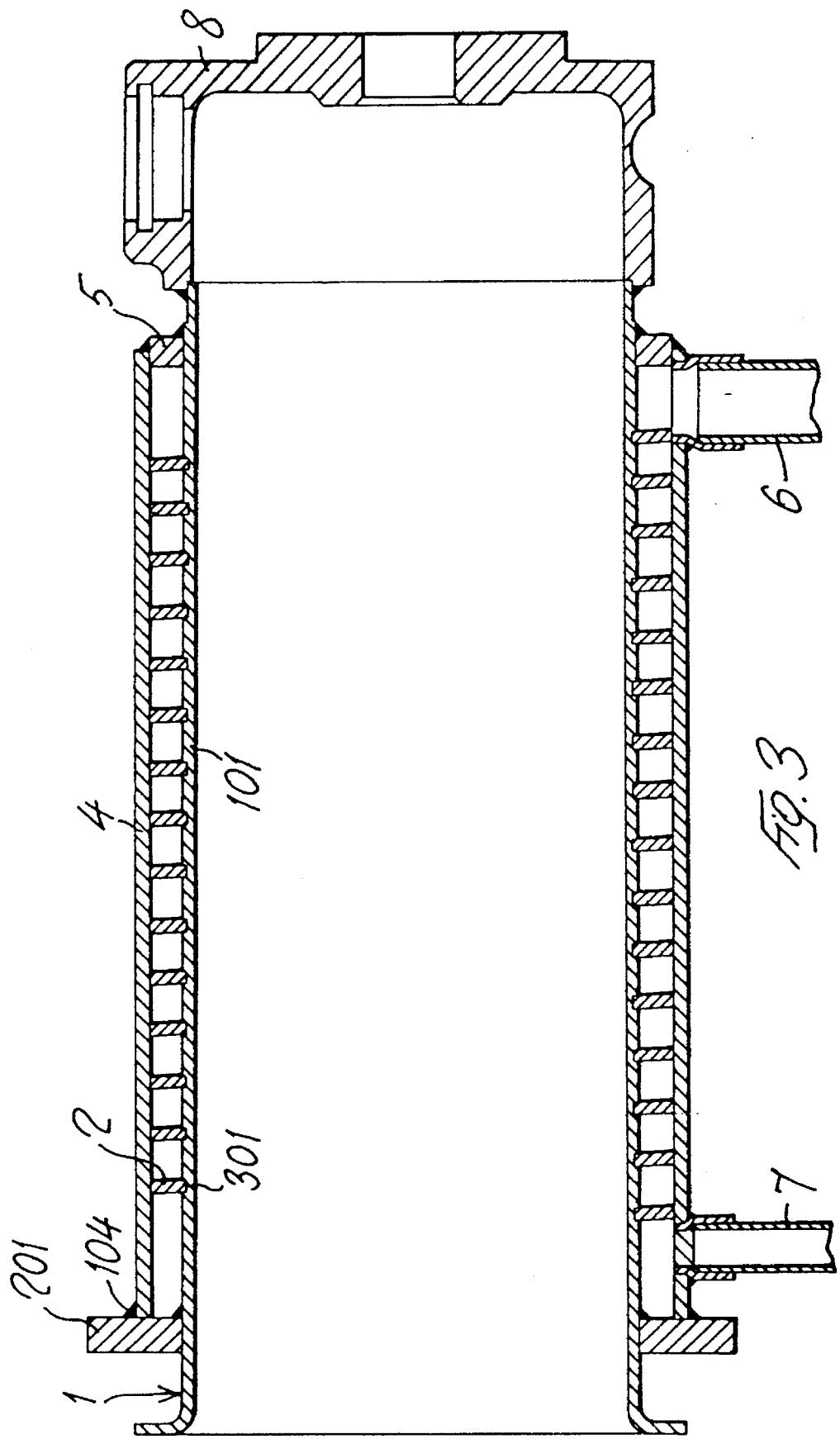

METHOD OF MANUFACTURING FREEZING CYLINDERS FOR ICE CREAM MAKING MACHINES

FIELD OF THE INVENTION

The present invention relates generally to the heat exchangers, and more particularly to the freezing cylinders of the ice cream making machines, and a method of manufacturing them.

BACKGROUND OF THE INVENTION

It is notorious that in order to chill the freezing cylinders of ice cream making machines, said cylinders are arranged in heat-exchange relationship with the evaporator of a refrigerating unit. Usually, this is carried out by helically winding the evaporator tubing about the outer surface of the freezing cylinder, and then by welding it or by fixing it With suitable heat-conducting adhesives to said cylinder, so as to promote heat transfer extensively between these two elements. This method is time-consuming and expensive, and it does not achieve an optimum heat transfer. It has been also suggested, as disclosed for instance in the Italian Patent No. 464.025 filed Apr. 19, 1950, to line the freezing cylinder with an outer liner acting as an expansion chamber for the compressed gases coming from the compressor of the refrigerating unit. This system eliminates, due to the direct expansion of gases, the drawbacks connected to the heat-transfer; however, also this system cannot be worked out easily due to the difficulties in welding the outer liner to the surface of the freezing cylinder.

From EP-A-0 395 080 a method for the manufacture of a reactor vessel is known comprising the steps of forming an inner cylindrical sleeve from a single continuous sheet of metal with a single length wise weld, welding a continuous spiral support to the outer wall surface of said inner sleeve, forming an outer cylindrical shell around said sleeve by pressing said inner surface of said shell firmly against said continuous spiral support and forming a single longitudinal weld to form a continuous spiral flow path around said inner sleeve in cooperation with said spiral support.

Also this method is difficult to be worked out, due to the difficulties in welding the spiral support to the inner sleeve, and further due to the difficulties of tightly adhering the cylindrical shell against the said spiral support.

SUMMARY OF THE INVENTION

Therefore, the object of the present invention is to provide a method of manufacturing freezing cylinders for ice cream making machines, provided with a space for the expansion of the refrigerating gas directly contacting said outer surface, adapted to overcome the drawbacks of the prior art cylinders of this type.

According to a main feature, the method of manufacture according to the invention comprises the steps of forming a helical groove on the outer surface of the freezing cylinder; bending a strip of annealed mild steel along said groove to shape it into a screw-thread fashion; shrink-fitting a heated cylindrical steel liner on said strip, and cooling the assembly thus obtained, whereby the thermal shrinkage of the steel liner creates a gas-tight engagement in the helical space defined between the inner surface of the liner and the outer surface of the freezing cylinder.

BRIEF DESCRIPTION OF THE DRAWINGS

Further characteristics and advantages of the procedure according to the invention will become more apparent from the following detailed description, made with reference to the accompanying drawing, wherein:

FIG. 3 is a view similar to FIGS. 1 and 2, showing a finished freezing cylinder.

DESCRIPTION OF THE PREFERRED EMBODIMENT OF THE INVENTION

Figure 1:
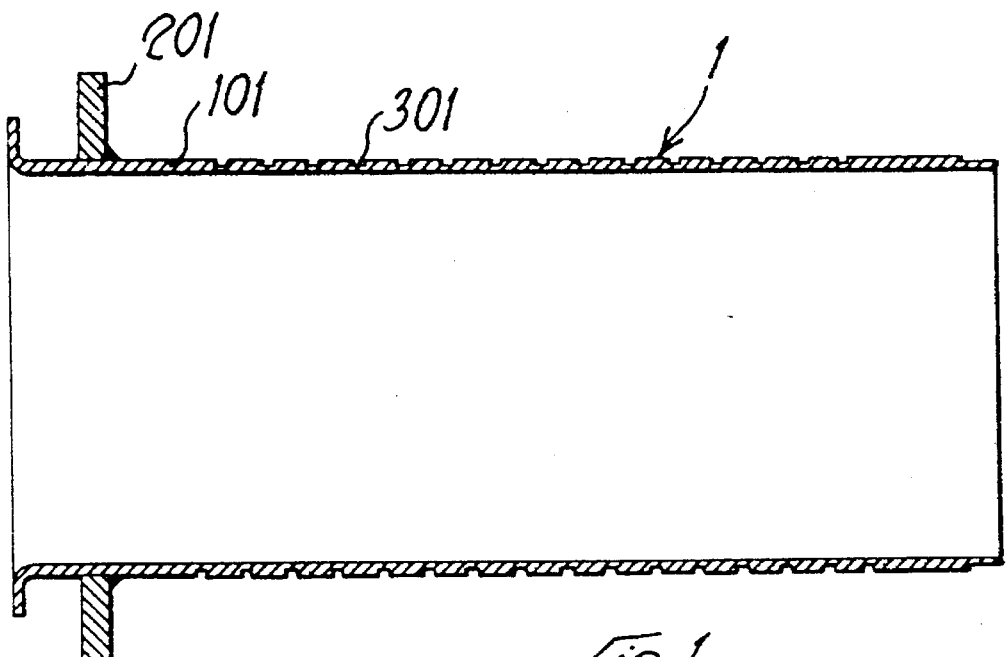
FIG. 1 is a diagrammatic longitudinal sectional view of the first stage in the manufacture of the freezing cylinder of an ice cream making machine in working out the method according to the invention.

With reference to the drawings, and with particular reference to FIG. 1 thereof, 1 indicates the freezing cylinder of an ice cream making machine. Said cylinder comprises, as shown, a length of stainless steel tube 101, provided in proximity of an end thereof with an annular flange 201 welded to its outer surface. The outer surface of the cylinder 1 is provided with a helical groove 301 extending over nearly its entire length.

Figure 2:
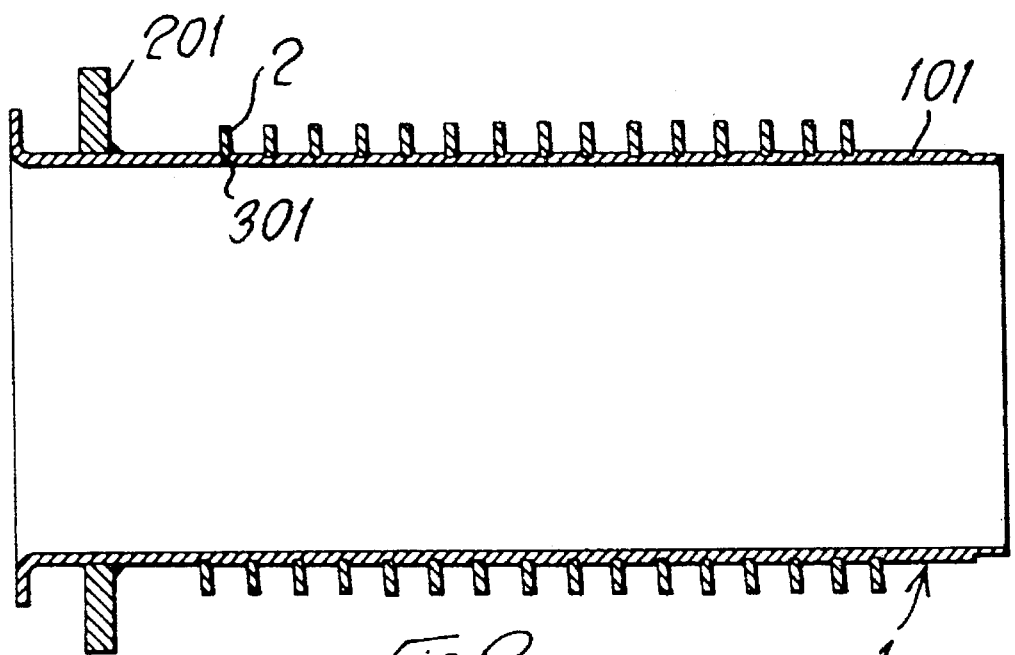
FIG. 2 is a view similar to FIG. 1, showing the successive manufacturing step.

As shown in FIG. 2, on the groove 301 there is wound a flat strip of annealed mild steel 2 so as to assume the shape of a screw thread. Hot-shrunk on the crests of the thread 2, as shown in FIG. 3, is a tubular steel liner 4, the thermal shrinkage of which creates a proper interference fit to ensure a gas-tightness in the helical path of travel formed between the inner surface of the liner 4, the outer surface of the cylinder 1 and the thread 2.

One end of the liner 4 is advantageously welded at to the flange 201, and the opposite end of the liner 4 is sealed by means of a ring 5 which is welded both to the liner 4 and the cylinder 1 to complete the evaporator of the refrigerating circuit. The liner 4 is then provided with holes for the unions to the inlet manifold (6) and outlet manifold (7) for the refrigerating circuit gas. The cylinder 1 is then completed by welding a cover 8 to its rear end.

The advantages of the method according to the invention are now apparent. It enables to create an expansion space directly in contact with the freezing cylinder, with all the advantages resulting from this technique, without resorting to the use of weldings, in a quick and inexpensive manner, and dispensing with some heat-treatments.

Of course, though the invention has been described specifically in connection with the freezing cylinders of ice cream making machines, it may be applied, obviously, for the manufacture of any tubular heat exchanger, like a reactore vessel, or the like.

I claim:

1. A method of manufacturing a tubular heat exchanger for use in a refrigerating unit, comprising the steps of:

forming a helical groove having a desired shade extending from an outer wall surface and into a portion of an inner cylindrical steel sleeve to a depth less than a thickness of said inner cylindrical steel sleeve;

winding a flat strip of annealed mild steel having a shape conforming to the shape of the helical groove in screw-thread fashion in said groove to form a screw-thread shaped member, while preserving the shape of said groove;

heating an outer cylindrical steel sleeve to allow insertion of the inner cylindrical steel sleeve with the screw-thread member therein;

shrink-fitting the previously heated outer cylindrical steel sleeve onto the crests of said member to anchor said member in said groove and to form an interference fit and a fluid-tight annular space between said inner and outer cylindrical steel sleeves; and forming, at opposed ends of said outer cylindrical steel sleeve, tubular unions for connection to a refrigerating unit.

2. A method according to claim 1, further comprising the steps of sealing opposed ends of the annular space between the said inner and outer cylindrical steel sleeves.

* * * * *